US012599155B2

(12) United States Patent (10) Patent No.: US 12,599,155 B2
Briggeman et al. (45) Date of Patent: Apr. 14, 2026

(54) SYSTEM AND METHOD OF NON-LINEAR COOK TIME ESTIMATION

(71) Applicant: Fireboard Labs, LLC, Kansas City, MO (US)

(72) Inventors: Steven Matthew Briggeman, Kansas City, MO (US); Theodore Thomas Conrad, Olathe, KS (US)

(73) Assignee: Fireboard Labs, LLC, Kansas City, MO (US)

( * ) Notice: Subject to any disclaimer, the term of this patent is extended or adjusted under 35 U.S.C. 154(b) by 620 days.

(21) Appl. No.: 18/069,036

(22) Filed: Dec. 20, 2022

(65) Prior Publication Data

US 2023/0189851 A1 Jun. 22, 2023

Related U.S. Application Data

(60) Provisional application No. 63/291,732, filed on Dec. 20, 2021.

(51) Int. Cl.
*A23L 5/10* (2016.01)
*G05B 19/042* (2006.01)
(52) U.S. Cl.
CPC .............. *A23L 5/10* (2016.08); *G05B 19/042* (2013.01); *G05B 2219/2643* (2013.01)
(58) Field of Classification Search
CPC ........... A23L 5/10; A47J 27/10; G05B 19/042
See application file for complete search history.

(56) References Cited

U.S. PATENT DOCUMENTS

| | | | |
|---|---|---|---|
| 7,075,442 B2 | 7/2006 | Lion et al. | |
| 9,154,559 B1 | 10/2015 | Bovee et al. | |
| 11,058,132 B2 * | 7/2021 | Wang .................... | A47J 36/321 |
| 2007/0215599 A1 | 9/2007 | Kahler | |
| 2012/0225170 A1 | 9/2012 | Sonnendorfer | |
| 2016/0377490 A1 | 12/2016 | Nivala et al. | |
| 2022/0049992 A1 | 2/2022 | Nivala et al. | |
| 2022/0053975 A1 | 2/2022 | Young | |

OTHER PUBLICATIONS

Acurite Instruction Manual, Digital Cooking Thermometer Models 00278/0282.
Amazon Alexa Blog Article—Coming Soon: Updated Smart Home Skill API Enables Alexa to Control More Types of Cooking Appliances (Sep. 25, 2019).
Combustion Inc. Start Cooking—Getting Started Using Your Thermometer, https://combustion.inc/pages/start (Dec. 1, 2022).

(Continued)

*Primary Examiner* — Lam S Nguyen
(74) *Attorney, Agent, or Firm* — Hovey Williams LLP

(57) ABSTRACT

A computer-implemented method for food cook completion estimation that includes: acquiring food temperature data from a first food item, the food temperature data comprising a plurality of food temperatures detected at a plurality of different times and reflecting a change in food temperature over time; selecting, based on the change in food temperature, a first non-linear prior cook profile from a plurality of non-linear prior cook profiles stored in a database that includes the first non-linear prior cook profile; and estimating a cook completion time based on the first non-linear prior cook profile.

11 Claims, 5 Drawing Sheets

(56) References Cited

OTHER PUBLICATIONS

Maverick BT-30 Stake Bluetooth Truly Wireless Intelligent Food Thermometer https://www.maverickthermometers.com/product/bt-30-bluetooth-stake-truly-wireless-intelligent-food-thermometer/ (printed Jan. 23, 2023).

Meat Perfection—The Smart Wireless Meat Thermomotor https://https://themeatstick.com/ (printed Jan. 23, 2023).

Tappecue AirProbe2 https://www.tappecue.com/airprobe2 (printed Jan. 23, 2023).

Combustion Inc. Thermometer https://combustion.inc/ (printed Jan. 23, 2023).

* cited by examiner

SYSTEM AND METHOD OF NON-LINEAR COOK TIME ESTIMATION

RELATED APPLICATIONS

The present application claims priority to U.S. Provisional Patent Application Ser. No. 63/291,732, filed Dec. 20, 2021, and entitled ANALYZING AND ESTIMATING COMPLETED COOKING TIME IN FOOD, the entirety of which is hereby incorporated by reference herein.

FIELD OF THE DISCLOSURE

The field of the disclosure relates generally to food cook time estimation and, more particularly, to a system and method for empirical, non-linear food cook time estimation.

BACKGROUND OF THE DISCLOSURE

Planning for food cooking sessions often involves applying linear estimation formulas—e.g., where a user plans to cook for one hour for every pound of meat in a food item—to determine how long the cook will take. However, existing systems and methods are imprecise, and are unable—and, in fact, overwhelmingly do not even seek—to harness more robust data dimensionality to improve precision. Accordingly, there is a need for an improved system and method configured for and capable of delivering enhanced cook session planning.

BRIEF DESCRIPTION OF THE DISCLOSURE

This brief description is provided to introduce a selection of concepts in a simplified form that are further described in the detailed description below. This brief description is not intended to identify key features or essential features of the claimed subject matter, nor is it intended to be used to limit the scope of the claimed subject matter. Other aspects and advantages of the present disclosure will be apparent from the following detailed description of the embodiments and the accompanying figures.

In one aspect, a computer-implemented method for food cook completion estimation is provided. The method includes: acquiring food temperature data from a first food item, the food temperature data comprising a plurality of food temperatures detected at a plurality of different times and reflecting a change in food temperature over time; selecting, based on the change in food temperature, a first non-linear prior cook profile from a plurality of non-linear prior cook profiles stored in a database that includes the first non-linear prior cook profile; and estimating a cook completion time based on the first non-linear prior cook profile. The method may include additional, less, or alternate actions, including those discussed elsewhere herein.

In another aspect, a system for food cook completion estimation is provided. The system includes one or more processors and non-transitory computer-readable storage media having computer-executable instructions thereon. When executed by the one or more processors, the instructions cause the one or more processors to: acquire food temperature data from a first food item, the food temperature data comprising a plurality of food temperatures detected at a plurality of different times and reflecting a change in food temperature over time; select, based on the change in food temperature, a first non-linear prior cook profile from a plurality of non-linear prior cook profiles stored in a database that includes the first non-linear prior cook profile; and estimate a cook completion time based on the first non-linear prior cook profile. The system may include additional, less, or alternate functionality, including that discussed elsewhere herein.

A variety of additional aspects will be set forth in the detailed description that follows. These aspects can relate to individual features and to combinations of features. Advantages of these and other aspects will become more apparent to those skilled in the art from the following description of the exemplary embodiments which have been shown and described by way of illustration. As will be realized, the present aspects described herein may be capable of other and different aspects, and their details are capable of modification in various respects. Accordingly, the figures and description are to be regarded as illustrative in nature and not as restrictive.

BRIEF DESCRIPTION OF THE DRAWINGS

The figures described below depict various aspects of systems and methods disclosed therein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

Unless otherwise indicated, the figures provided herein are meant to illustrate features of embodiments of this disclosure. These features are believed to be applicable in a wide variety of systems comprising one or more embodiments of this disclosure. As such, the figures are not meant to include all conventional features known by those of ordinary skill in the art to be required for the practice of the embodiments disclosed herein.

DETAILED DESCRIPTION OF THE DISCLOSURE

The following detailed description of embodiments of the invention references the accompanying figures. The embodiments are intended to describe aspects of the invention in sufficient detail to enable those with ordinary skill in the art to practice the invention. The embodiments of the invention are illustrated by way of example and not by way of limitation. Other embodiments may be utilized, and changes may be made without departing from the scope of the claims. The following description is, therefore, not limiting. The scope of the present invention is defined only by the appended claims, along with the full scope of equivalents to which such claims are entitled.

Exemplary System

Figure 1:
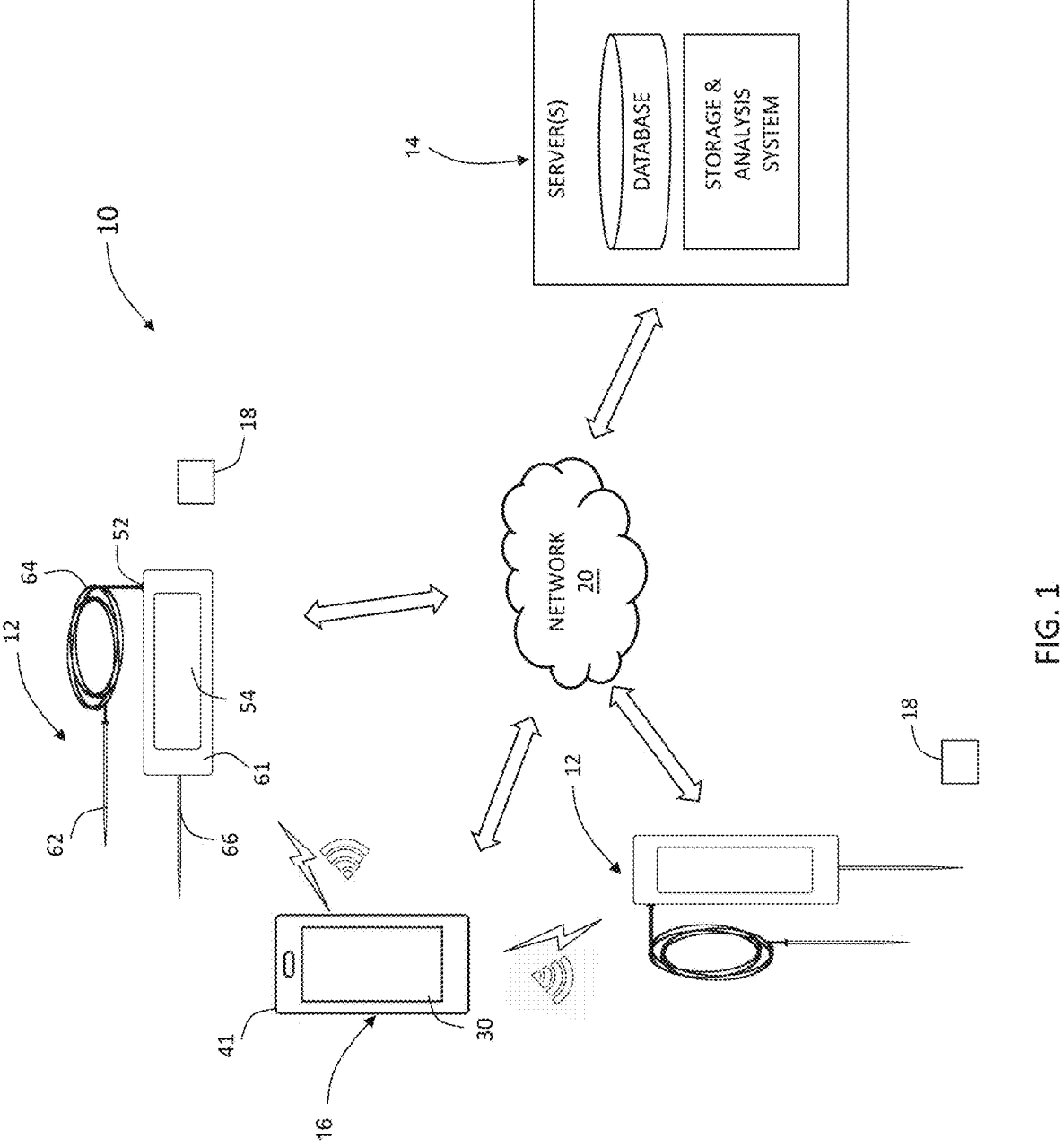
FIG. 1 is a block diagram of an example system for non-linear cook time estimation, in accordance with one or more embodiments of the present disclosure.

FIG. 1 depicts an exemplary environment 10 for non-linear cook time estimation according to embodiments of the present invention. The environment 10 may include a plurality of thermal sensors 12 comprising thermometers, one or more server(s) 14, a mobile electronic device 16, a plurality of food labels 18, and a communication network 20. The thermometers 12, the mobile electronic device 16, and internal portions of the network 20 may be located within network boundaries of an organization, such as a corporation, a government office, or the like, or of an individual such as a homeowner. Other portions of the communication network 20 and the server(s) 14 may be external to the organization or individual, for example where the thermometer(s) 12 and/or the mobile electronic device 16 are individually or collectively configured to submit and request/acquire data to and from one or more third party server(s) 14—such as those existing within a third party cloud infrastructure environment—via application programming interface(s) (APIs) or the like.

Accordingly, the thermometers 12 and mobile electronic device 16 may be connected to an internal network portion of the network 20, the internal network portion being managed by the organization or individual and which may correspondingly comprise a trusted internal network or the like. Alternatively or in addition, the thermometers 12 and mobile electronic device 16 may manage access to the APIs and/or corresponding server(s) 14 under a common authentication management framework. Each user of a thermometer 12 and/or mobile electronic device 16 may be required to complete an authentication process to submit data to and/or access or acquire data from the server(s) 14.

It should be noted, however, that all or some of server(s) 14 may be maintained and/or owned by the organization/ individual and/or may be maintained on internal portion(s) of the network 20 within the scope of the present invention. One of ordinary skill will appreciate that the server(s) 14 may be free of, and/or subject to different protocol(s) of, the common authentication management framework within the scope of the present invention.

Figure 2:
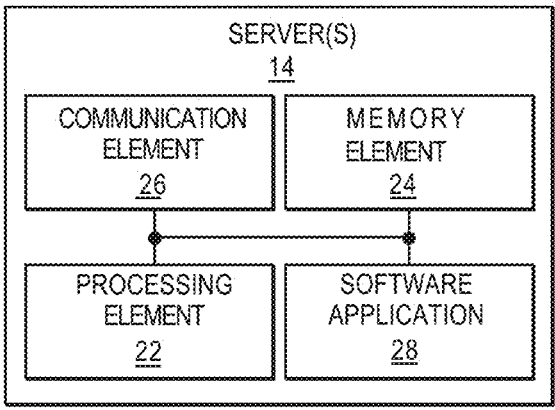
FIG. 2 is a simplified block diagram of an example server for use with the non-linear cook time estimation system of FIG. 1.

The server(s) 14 may include a plurality of proxy servers, web servers, communications servers, routers, load balancers, and/or firewall servers, as are commonly known, and may comprise a cloud infrastructure and/or cloud services environment. The server(s) 14 may comprise domain controllers, application servers, database servers, file servers, mail servers, catalog servers or the like, or combinations thereof. The server(s) 14 generally implement a platform for managing receipt, storage, retrieval and analysis of food temperature data and food metadata. The server(s) 14 may retain electronic data and may respond to requests to retrieve data as well as to store data. Generally, and with reference to FIG. 2, each server 14 may include a processing element 22, a memory element 24, a transceiver or communication element 26, and a software program 28.

In one or more embodiments, one or more APIs may be maintained by the server(s) 14. The APIs may include and/or provide access to one or more pages or sets of data and/or other content accessed through the World Wide Web (e.g., through the communication network 20) and/or through the internal portion(s) of the network 20. The APIs may be hosted by or stored on a web server and/or database server of the server(s) 14, for example. The APIs may include and/or be access via top-level domains such as ".com", ".org", ".gov", and so forth. The APIs may be accessed using software such as a web browser, through execution of one or more script(s) for obtaining data, and/or by other means for interacting with the APIs without departing from the spirit of the present invention.

The communication network 20 generally allows communication between the thermometers 12, server(s) 14, and mobile electronic device 16. The network 20 may include the Internet, cellular communication networks, local area networks, metro area networks, wide area networks, cloud networks, plain old telephone service (POTS) networks, and the like, or combinations thereof. The network 20 may be wired, wireless, or combinations thereof and may include components such as modems, gateways, switches, routers, hubs, access points, repeaters, towers, and the like. The thermometers 12, server(s) 14 and/or mobile electronic device 16 may, for example, connect to the network 20 either through wires, such as electrical cables or fiber optic cables, or wirelessly, such as RF communication using wireless standards such as cellular 2G, 3G, 4G or 5G, Institute of Electrical and Electronics Engineers (IEEE) 802.11 standards such as WiFi, IEEE 802.16 standards such as WiMAX, Bluetooth™, or combinations thereof.

Figure 3:
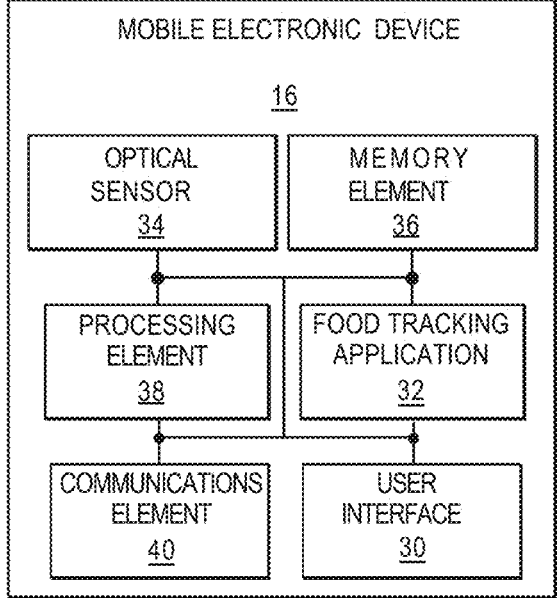
FIG. 3 is a simplified block diagram of an example mobile electronic device for use with the non-linear cook time estimation system of FIG. 1.

Turning to FIG. 3, the mobile electronic device 16 can be any computing device capable of interconnecting to the network 20 (e.g., comprising an internal WiFi network and the Internet) and to the thermometers 12, including a mobile web-based device, smartphone, PDA, desktop computer, laptop, smart watch or other mobile web-based connectable equipment. The mobile electronic device 16 is interconnected to the Internet through one or more interfaces including a network, such as a local area network (LAN) or a wide area network (WAN), dial-in-connections, cable modems, wireless modems, and special high-speed ISDN lines. In addition, in the example embodiment, the mobile electronic device 16 is configured to communicate with other user computing devices, the thermometers 12 and/or labels 18 using various forms of communication including, for example, radio frequency communication, near field communication (NFC), network-based communication, WiFi, IEEE 802.16 standards such as WiMAX, Bluetooth™, and the like.

In the exemplary embodiment, the mobile electronic device 16 (e.g., a smartphone, tablet, laptop, desktop, or other computing device used by a user) includes a user interface 30 that facilitates user interaction with the mobile electronic device 16. For example, and without limitation, the user interface 30 enables the user to input information to the mobile electronic device 16, and the mobile electronic device 16 to output information to the user (e.g., on a display of the mobile electronic device 16). The user interface 30 includes and/or exchanges inputs and outputs with, for example, a digital food tracking application 32 (broadly, a food tracking app), which is installed on the mobile electronic device 16. The exemplary mobile electronic device 16 additionally includes an optical sensor 34, such as a photographic element, as well as processing and communication elements 38, 40, discussed in more detail below. One of ordinary skill will appreciate that the components of the mobile electronic device 16 described herein are preferably integrated into and housed in a body or casing 41 of the device 16.

Figure 4:
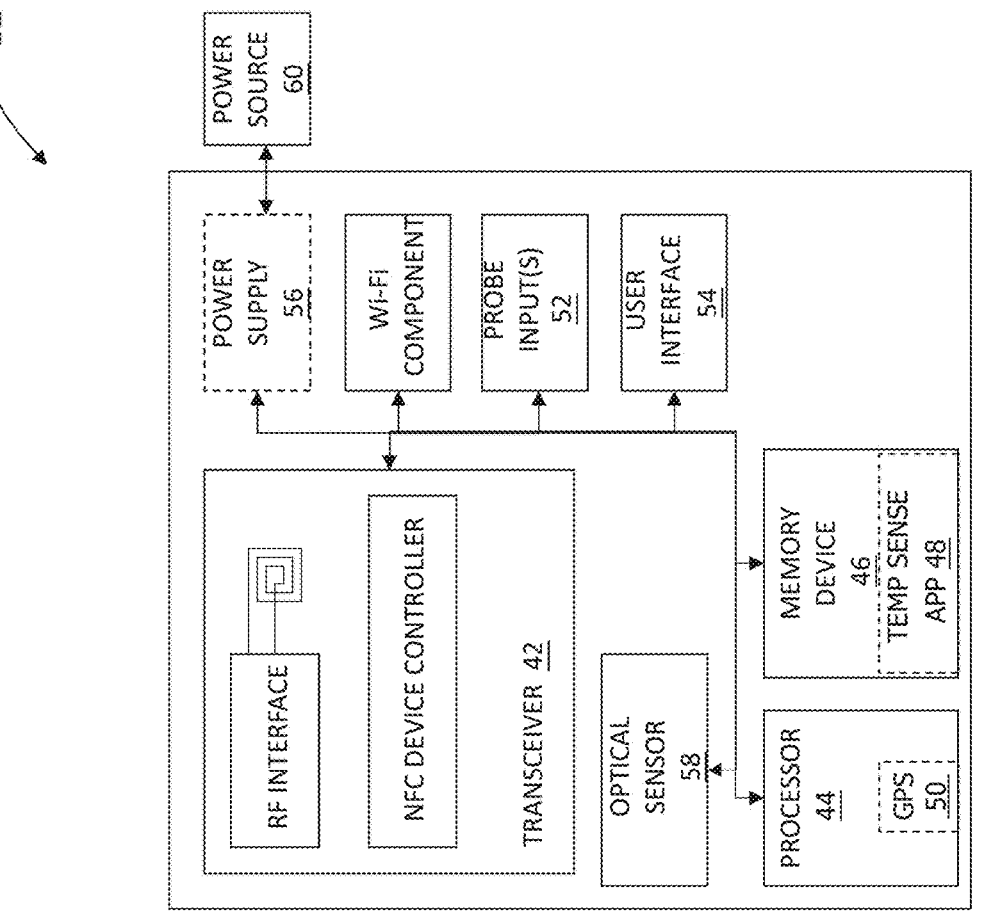
FIG. 4 is a simplified block diagram of an example thermometer for use with the non-linear cook time estimation system of FIG. 1.

Turning now to FIG. 4, the thermometers 12 may each include a communications element or transceiver 42, one or more processing elements or processors 44, and a memory element or device 46 configured to store a temperature sensing app 48 including computer-executable instructions for acquisition, storage and/or transmission of food temperature data and/or food metadata. The thermometers 12 may also each include a geoposition chip or device 50, one or more probe input(s) 52, a user interface 54, a power supply 56, and an optical sensor 58. Each thermometer may receive power—e.g., periodically during charge cycles and/or continuously during use—from a power source 60 (e.g., alternating current received from a wall electrical outlet or the like). In one or more embodiments, the power supply 56 comprises a rechargeable battery. One of ordinary skill will appreciate that the components of each thermometer 12 described herein are preferably integrated into and housed in a body or casing 61 of each thermometer 12.

A location of the thermometer 12 can be obtained through conventional methods, such as a location service (e.g., global positioning system (GPS) service) implemented via device 16 and food tracking application 32, which may "ping" the chip 50 for data that includes geotemporal data. For example, in one suitable embodiment, chip 50 can be part of or separate from the processor 44 to enable the location of the thermometer 12 to be determined. One of ordinary skill will appreciate that other geolocation methods may be utilized, such as triangulation via multiple proximate Bluetooth™-enabled device signals, without departing from the scope of the present invention.

The one or more probe input(s) 52 may include component(s) for receiving analog thermocouple or thermal probe signals and converting the signals to digital signals for interpretation and storage in the memory device 46. The input(s) 52 may include a port for receiving a plug of an external thermal probe 62 (see FIG. 1), the signal from the thermal probe 62 being transmitted to the input 52 via an electrically conductive wire 64. More generally, each thermometer 12 may also or alternatively include an integral, internal or built-in thermal probe 66. Thermal probe(s) 62, 66 may be inserted into food items (not shown), such as meat food items, periodically and/or continuously for generation of instant temperature readings and/or temperature or cook profiles over time, as discussed in more detail below.

Each of the user interfaces 30, 54 may include peripheral and/or input/output devices such as, for example, a touch screen. In one or more embodiments, the display can include, for example, and without limitation, a liquid crystal display (LCD), an organic light emitting diode (OLED) display, or an "electronic ink" display. In one or more embodiments, a single component such as a touch screen may function as both an output device and an input device. As such, the display may optionally include a touch controller for support of touch capability. One of ordinary skill will appreciate that various other mobile electronic device types, and diverse input/output means comprising user interfaces, are within the scope of the present invention.

It should also be noted that the food tracking application 32 and temperature sensing app 48 preferably include computer-readable instructions for respectively providing user interfaces 30, 54 to the user via the displays of the interfaces 30, 54 and, optionally, receiving and processing input from the interfaces 30, 54. A user interface 30, 54 may accordingly include, among other possibilities, software and hardware features enabling interaction with a web browser and the food tracking application 32, temperature sensing app 48 and/or software application 28 (e.g., via a corresponding API).

User interfaces 30, 54 preferably therefore comprise at least one media output component (e.g., displays) for presenting information to the user. In one or more embodiments, the media output component includes an output adapter such as a video adapter and/or an audio adapter. An output adapter is operatively coupled to the respective processor 38, 44 and operatively connectable to an output device such as a display device, for example, and without limitation, a liquid crystal display (LCD), organic light emitting diode (OLED) display, or "electronic ink" display, or an audio output device such as a speaker or headphones. In one or more embodiments, such components of the user interfaces 30, 54 accordingly present temperature data, food metadata (e.g., in the form of lists or menus of pre-defined options), and cook time estimates and/or graphs and the like to a user.

The optical sensors 34, 58 respectively may include a camera or other optical sensor and lens combination capable of sensing and capturing light waves and converting corresponding analog signals to digital signals for storage and/or transmission. When the optical sensor 34, 58 captures an image or otherwise generates image data (e.g., video data), the optical sensor 34, 58 may store the image data in a data file, either in a raw or compressed format, in a memory element 36, 46 of the mobile electronic device 16 or thermometer 12 and/or may transmit the data to the server(s) 14 and/or, in the case of acquisition by the thermometer 12, to the mobile electronic device 16.

The transceivers or communication elements 26, 40, 42 may generally allow communication between the thermometer(s) 12, the server(s) 14, the network 20, and/or the mobile electronic device 16. The communication elements 26, 40, 42 may include signal or data transmitting and receiving circuits, such as antennas, amplifiers, filters, mixers, oscillators, digital signal processors (DSPs), and the like. The communication elements 26, 40, 42 may establish communication wirelessly by utilizing radio frequency (RF) signals and/or data that comply with communication standards such as cellular 2G, 3G, 4G or 5G, Institute of Electrical and Electronics Engineers (IEEE) 802.11 standard such as WiFi, IEEE 802.16 standard such as WiMAX, Bluetooth™, or combinations thereof. In addition, the communication elements 26, 40, 42 may utilize communication standards such as ANT, ANT+, Bluetooth™ low energy (BLE), the industrial, scientific, and medical (ISM) band at 2.4 gigahertz (GHz), or the like. Alternatively, or in addition, the communication elements 26, 40, 42 may establish communication through connectors or couplers that receive metal conductor wires or cables, like Cat 6 or coax cable, which are compatible with networking technologies such as ethernet. In certain embodiments, the communication elements 26, 40, 42 may also couple with optical fiber cables. The communication elements 26, 40, 42 may respectively be in communication with the processing elements 22, 38, 44 and/or the memory elements 24, 36, 46.

The memory elements 24, 36, 46 may include electronic hardware data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In one or more embodiments, the memory elements 24, 36, 46 may be embedded in, or packaged in the same package as, the processing elements 22, 38, 44. The memory elements 24, 36, 46 may include, or may constitute, a "computer-readable medium." The memory elements 24, 36, 46 may store the instructions, code, code segments, software, firmware, programs, applications, apps, services, daemons, or the like that are executed by the processing elements 22, 38, 44. In one or more embodiments, the memory elements 24, 36, 46 respectively store the software applications/programs 28, 32, 48. The memory elements 24, 36, 46 may also store settings, data, documents, sound files, photographs, movies, images, databases, and the like.

The food temperature data and/or polynomial equations derived therefrom and discussed throughout this disclosure may be stored in food item records of or otherwise in databases managed by the server(s) 14 utilizing any of a variety of formats and structures within the scope of the invention. For instance, relational databases and/or object-oriented databases may embody such databases. Also or alternatively, such database(s) may be stored and managed by or on the mobile electronic device 16. The databases may utilize a variety of formats and structures within the scope of the invention, such as Simple Object Access Protocol (SOAP), Remote Procedure Call (RPC), and/or Representational State Transfer (REST) types. One of ordinary skill will appreciate that—while examples presented herein may discuss specific types of databases—a wide variety may be used alone or in combination within the scope of the present invention.

The processing elements 22, 38, 44 may include electronic hardware components such as processors. The processing elements 22, 38, 44 may include microprocessors (single-core and multi-core), microcontrollers, digital signal processors (DSPs), field-programmable gate arrays (FP-GAs), analog and/or digital application-specific integrated circuits (ASICs), or the like, or combinations thereof. The processing elements 22, 38, 44 may include digital processing unit(s). The processing elements 22, 38, 44 may generally execute, process, or run instructions, code, code segments, software, firmware, programs, applications, apps, processes, services, daemons, or the like. For instance, the processing elements 22, 38, 44 may respectively execute the software applications/program 28, 32, 48. The processing elements 22, 38, 44 may also include hardware components such as finite-state machines, sequential and combinational logic, and other electronic circuits that can perform the functions necessary for the operation of the current invention. The processing elements 22, 38, 44 may be in communication with the other electronic components through serial or parallel links that include universal busses, address busses, data busses, control lines, and the like.

Through hardware, software, firmware, or various combinations thereof, the processors or processing elements 22, 38, 44 may—individually, in subset(s), together and/or in combination with other processing elements—be configured to perform the operations of embodiments of the present invention described herein. In one or more embodiments, the software applications/programs 28, 32, 48 respectively include instructions executed by the processing elements 22, 38, 44 for performance of the steps and computations described herein. In one or more embodiments, the instructions are configured for execution to perform the step(s) attributable to each device respectively according to the description of the preferred embodiments described herein.

The system 10 also optionally includes labels 18 respectively positioned proximate respective food item(s) (not shown). Labels 18 comprise or store food metadata—such as food category/type, target temperature, user identification information and/or other metadata—for communication to the thermometer 12 and/or mobile electronic device 16. In this manner, one of ordinary skill will appreciate that certain food metadata discussed herein may be acquired from the labels 18 also or alternatively to acquisition via user interface(s) 30, 54. In one or more embodiments, a label 18 may encode food metadata visually (i.e., in the form of a one- or two-dimensional visual pattern code, such as a barcode or quick response (QR) code) for scanning by one of the optical sensors 34, 58. Also or alternatively, the label 18 may encode the metadata for transmission via radio waves (e.g., via NFC or Bluetooth components). More particularly, in one or more embodiments, the label 18 may include an antenna comprising a looped wire configured to transmit radio signals when current flows through the looped wire. The antenna may be any size, shape, and configuration that is suitable for transmitting signals as described herein. For example, the antenna may be a tuned circuit configured to transmit radio signals in any radio-based communication system including, but not limited to, Radio Frequency Identification (RFID), Wireless Local Area Network (WLAN), and Wireless Personal Area Network (WPAN) systems. In the example embodiment, the antenna generates a magnetic field when it vibrates at a selected frequency. Specifically, the antenna is configured to vibrate at a frequency of about 13.56 MHz, which is suitable for use in a near field communication (NFC) system.

In the example embodiment, the antenna transmits radio signals to and receives radio signals from other wireless-enabled computing devices, for example, the transceivers 40, 42 of the mobile electronic device 16 and thermometer 12. In NFC systems, for example, at least one NFC component generates a magnetic field to inductively transfer currents and, thereby, exchange signals and information with other NFC components positioned within the magnetic field. In one example embodiment, the antenna functions as an NFC component to send and receive signals. The antenna is configured to transmit radio signals to NFC components positioned within the magnetic field of the antenna, such as when the mobile electronic device 16 or thermometer 12 is located within a predetermined distance of the label 18. Therefore, the magnetic field generated by the antenna defines the active range of the label 18. Additionally, the antenna receives radio signals from NFC components when the antenna is positioned within the magnetic field of the NFC components.

The system may include additional, less, or alternate functionality and/or device(s), including those discussed elsewhere herein. The following detailed description is, therefore, not to be taken in a limiting sense. The scope of the present invention is defined only by the appended claims, along with the full scope of equivalents to which such claims are entitled.

Specific embodiments of the technology will now be described in connection with the attached drawing figures. The embodiments are intended to describe aspects of the invention in sufficient detail to enable those skilled in the art to practice the invention. Other embodiments can be utilized and changes can be made without departing from the scope of the present invention.

Exemplary Computer-Implemented Method for Non-Linear Cook Time Estimation

Figure 5:
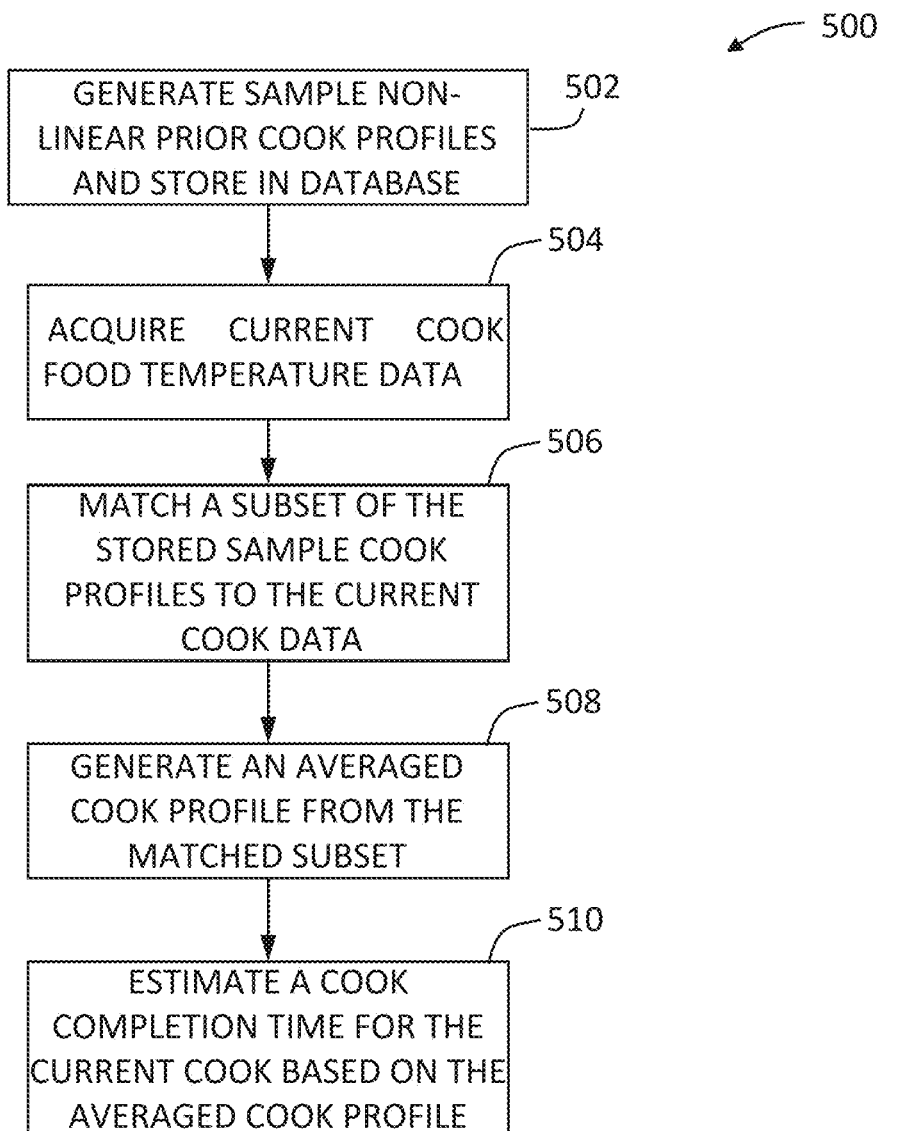
FIG. 5 depicts a flow diagram of an exemplary computer-implemented method for non-linear cook time estimation, in accordance with one or more embodiments of the present disclosure.

FIG. 5 depicts a flowchart including a listing of steps of an exemplary computer-implemented method 500 for non-linear cook time estimation. The steps may be performed in the order shown in FIG. 5, or they may be performed in a different order. Furthermore, some steps may be performed concurrently as opposed to sequentially. In addition, some steps may be optional.

The computer-implemented method 500 is described below, for ease of reference, as being executed by exemplary devices and components introduced with the embodiments illustrated in FIGS. 1-4. For example, the steps of the computer-implemented method 500 may be performed by the thermometer(s) 12, the server 14, the mobile electronic device 16, and/or the network 20 through the utilization of processors, transceivers, hardware, software, firmware, or combinations thereof. However, a person having ordinary skill will appreciate that responsibility for all or some of such actions may be distributed differently among such devices or other computing devices, or among subsets of the foregoing, without departing from the spirit of the present invention. One or more computer-readable medium(s) may also be provided. The computer-readable medium(s) may include one or more executable programs stored thereon, wherein the program(s) instruct one or more processing elements to perform all or certain of the steps outlined herein. The program(s) stored on the computer-readable medium(s) may instruct the processing element(s) to perform additional, fewer, or alternative actions, including those discussed elsewhere herein.

Referring to step 502, one or more sample non-linear prior cook profiles may be generated and stored in a database. Step 502 may be performed by one or more of the processors of the thermometer, mobile electronic device and server. In one or more embodiments, temperature data is collected by one or more thermometers and transmitted to one or both of the mobile electronic device and server for storage as and/or building of the sample non-linear prior cook profiles in corresponding food item database records.

The sample non-linear prior cook profiles may comprise a plurality of temperatures corresponding to a plurality of different times (e.g., a timestamp for each corresponding temperature reading). Each of the sample non-linear prior cook profiles may be associated with one of a plurality of food items, and may be acquired or generated by or based on the input of a current user (e.g., where a current user stores his/her own prior cooks to guide future cooks) and/or one or more third party users (e.g., where data from prior cooks are crowd-sourced among one or more third party users).

In one or more embodiments, the food temperature data comprising the sample non-linear prior cook profiles are acquired by a thermometer for each of the plurality of food items. The food temperature data may be acquired simultaneously for each of the food items by the respective corresponding thermometers or over time and/or in staggered fashion to populate the database with multiple sample non-linear prior cook profiles.

In one or more embodiments, the mobile electronic device may include a food tracking application configured to set up the thermometers of the exemplary system for electronic communication with one or more server(s), e.g., in a cloud server infrastructure. The cloud server infrastructure may host and manage a platform for managing receipt, storage, retrieval and analysis of food temperature data and food metadata. In one or more embodiments, the food tracking application establishes a Bluetooth™ or similar wireless connection to the thermometers and establishes a WiFi electronic communication connection between the thermometers and the Internet (e.g., to the server(s)).

In one or more embodiments, food temperature data for each of the food items may be acquired by a built-in or integral thermal probe of the thermometer. Also or alternatively, the food temperature data may be acquired by an external thermal probe of the thermometer, for example a probe, a conductor wire and a plug for removable insertion into a port of the thermometer. The thermal probe may comprise a thermocouple or other temperature sensor configured for producing output comprising analog sensor signals corresponding to food temperature and converting the analog output to digital signals. One of ordinary skill will appreciate that food temperature data may be acquired via other sensors, e.g., via infrared sensors, within the scope of the present invention.

Thermal probe sensor output or other thermometer output may be automatically converted to digital signals and recorded, or may first be filtered based on a stabilization threshold prior to being recorded or saved for a food item. For example, in one or more embodiments, the sensor output signals may be analyzed to determine a rate of change in sensed food temperature over a unit time (e.g., change per second). Once the rate of change in sensed food temperature is below a stabilization threshold, the thermometer may be configured to capture and record the temperature(s) occurring thereafter for inclusion in a corresponding non-linear prior cook profile.

The food temperature data may comprise a plurality of recorded temperatures for each food item. For example, an integral or built-in probe of a thermometer may capture and record an initial temperature at a time zero or the beginning of a cook for a food item. An external probe of the thermometer may be inserted subsequently into the food item and left inserted for collection of multiple temperatures over time. Also or alternatively, in one or more embodiments one probe of a thermometer may gather food item internal temperature data while another of the probes of the thermometer gathers ambient or heating element temperature during a cook to use as metadata for profile matching steps discussed in more detail below.

The thermometer may also include a digital clock and/or may obtain a time value over its communication element to associate as a timestamp with each temperature reading of the current food temperature data. Correspondingly, the food temperature data for each of the food items may be displayed at a user interface of the thermometer and/or mobile electronic device and/or may be analyzed as a time-varying plot comprising the corresponding non-linear prior cook profile.

In one or more embodiments, the thermometer transmits the food temperature data to the mobile electronic device and/or to the server(s) via the corresponding communication element.

Moreover, in one or more embodiments, metadata is also saved in the records of the database corresponding to respective food items along with the plurality of sample non-linear prior cook profiles. In one or more embodiments, the metadata—e.g., describing a food category or type for each of the food items, a target (or final) temperature for each of the food items, user identification information, and other data describing each food item—may be encoded by a label positioned proximate each corresponding food item and scanned/acquired by the thermometer or mobile electronic device in connection with acquisition of the temperature data for each cook.

In one or more embodiments, the metadata may also or alternatively be input at a user interface of the thermometer or mobile electronic device. For example, the food tracking application and/or the temperature sensing app may include computer-executable instructions for display at a user interface of lists of options for food category or type (e.g., "chicken, pork, beef, steak" or the like), for target temperature, for user identification and/or system login information, and/or for other important aspects or characteristics of the food items, and for receipt of user input selecting or otherwise inputting one or more of such options.

It is also foreseen that an ambient or heating element (e.g., smoker or oven setting) temperature and/or humidity may be acquired one or more times (e.g., periodically or continuously) in connection with each food item and saved as part of the metadata. For example, the ambient or heating element temperature and/or humidity may be acquired from the mobile electronic device or from one of the thermometers.

In one or more embodiments, the heating element may comprise an Internet of Things (IoT) device or similar device enabled with wireless communication capabilities sufficient to provide or transmit a heating element temperature or setting during the cook to the thermometer, mobile electronic device and/or server for use as metadata in profile matching steps discussed in more detail below.

In one or more embodiments, the humidity may be acquired by a callout from the food tracking application of the mobile electronic database to a weather application and/or API accessible via a communication network and/or the Internet. In one or more embodiments, the ambient or heating element temperature and/or humidity may be used as additional metadata datapoints for matching a current food item to one or more of the sample non-linear prior cook profiles, in each case discussed in more detail below.

One of ordinary skill will appreciate that pre-determined options for collecting metadata presented to the user at the user interface of the mobile electronic device and/or thermometer may be obtained from the memory element(s) of the mobile electronic device and/or the server(s) within the scope of the present invention. The presented options may first be filtered based on initial metadata, e.g., where selection or other acquisition of a food type narrows a list of options for target temperature for a respective one of the food items for subsequent display to the user. One of ordinary skill will appreciate that a variety of such pre-filters may be applied to narrow lists of pre-determined metadata options within the scope of the present invention.

It should also be noted that entry of free form metadata for the food item(s)—e.g., a target temperature—is also within the scope of the present invention.

In one or more embodiments, the thermometer and/or mobile electronic device transmits the metadata, alone or together with temperature data comprising the sample non-linear prior cook profiles, to the mobile electronic device and/or to the server(s), as the case may be, via the corresponding communication element.

In one or more embodiments, all or some of the metadata stored with each of the records comprising sample non-linear prior cook profiles may additionally or alternatively be calculated from or reflected within the food temperature data. For example, a cook start time (time zero) for each of the sample non-linear prior cook profiles may be calculated from the corresponding food temperature data. In one or more embodiments, the cook start time or time zero may be calculated as or determined to be the time at which a threshold pre-determined change in temperature over time— optionally customized for each food item type or category— for a food item is exceeded by the food temperature data (optionally, as determined following implementation of stabilization analyses discussed elsewhere herein). In another example, the target temperature or final temperature may be calculated as or determined to be one or more of the final temperature reflected by the food temperature data, the highest temperature reflected by the food temperature data, and the temperature at which the temperature data fails to reflect a threshold pre-determined change in temperature over time (optionally customized for each food item type or category, and optionally dependent on having first reached a threshold temperature, which may also or alternatively be dependent on food item type or category).

In yet another example, the cook duration for a sample non-linear prior cook profile may be determined as the time period between the cook start time and the time at which the target or final temperature is reached. In still yet another example, the metadata includes and/or each sample non-linear prior cook profile is converted to a polynomial equation comprising a line of best fit for the food temperature data of each food item. One of ordinary skill will appreciate that calculating the line of best fit and/or polynomial equation may optionally include soliciting and receiving user input (e.g., regarding mathematical parameters for polynomial determination via regression techniques or the like) without departing from the spirit of the present invention.

The thermometer, mobile electronic device and/or label proximate each food item may additionally include a geoposition chip or the like, as noted above. The thermometer and/or mobile electronic device may accordingly record a spatial position associated with the label (and, accordingly, the food item) at the time the label is optionally scanned and/or with the food item more directly at the time temperature data is taken. Temperature data regarding the food item may optionally be associated with the location, e.g., as a means for associating temperature data and/or metadata with the food item in question.

The metadata, food temperature data and/or sample non-linear prior cook profile for each of the food items may be saved in a corresponding food item record of the database. In one or more embodiments, the database is hosted and managed by one of the mobile electronic device and the server(s). One of ordinary skill will appreciate that a variety of computing devices may host and manage the database within the scope of the present invention.

As noted above, embodiments of the present invention enable analysis with higher data dimensionality and application of multiple sample non-linear prior cook profiles to a current cook, enabling swift, real-time automated and smart estimation of cook completion time. This advantage is enhanced where a large database of sample non-linear prior cook profiles is maintained. Accordingly, in one or more embodiments the step 502 is repeated for each of a plurality of food items to populate the database.

Referring to step 504, current cook food temperature data may be acquired. For example, in one or more embodiments, a current user may initiate a current cook for a food item by scanning a label positioned proximate the food item (e.g., acquiring a food item type or category), inserting a thermal probe of a thermometer into the food item, and/or providing input at the user's mobile electronic device and/or the thermometer signaling the start of a cook session (and, optionally, acquiring metadata regarding the food item). One or more of these events, or other events, may trigger the thermometer to begin collecting current food temperature data comprising a plurality of temperatures and a plurality of corresponding different times at which the temperatures were sensed.

The current food temperature data and related metadata regarding the current cook food item may be collected and/or generated/calculated according to the teachings disclosed in connection with step 502 above, though the final or target temperature is preferably acquired as input from the current user (e.g., via manual input and/or selection from a pre-defined list of options for cook temperature which may optionally be narrowed or pre-filtered based, for example, on a food type or category for the food item).

In one or more embodiments, the thermometer and/or mobile electronic device transmits the current food item metadata, alone or together with the current food temperature data, to the mobile electronic device and/or to the server(s), as the case may be, via the corresponding communication element.

Referring to step 506, one or more of the sample non-linear prior cook profiles are matched to or otherwise selected in view of the current food temperature data. Step 506 may be performed by one or more of the processors of the thermometer, mobile electronic device and server. In one or more embodiments, step 506 is performed by the server hosting and managing the database comprising the plurality of sample non-linear prior cook profiles following receipt of the current food temperature data.

As discussed in more detail below, step 506 may be performed once or multiple times throughout the current cook, and may be performed periodically or iteratively during the cook as additional current food temperature data is received on a rolling basis, to thereby provide multiple sets of corresponding updated cook completion time estimates for the current cook.

The matching may be based on one or more datapoints comprising types of metadata and aspects or measures of the current food temperature data and sample non-linear prior cook profiles. Where more than one datapoint is used for matching, the datapoints may be weighted relative to one another in a weighted summation, e.g., where matched ones of the sample non-linear prior cook profiles achieve a sum greater than a threshold relevance. Also or alternatively, the datapoints may be evaluated for matching using various other computations, decisions trees, neural networks or other machine learning techniques, models or other logical schema.

For example, in one or more embodiments, the metadata may describe any characteristic of the food item or its immediate surroundings or conditions relevant to cooking properties, such as food category or type (e.g., "chicken, pork, beef, steak, hamburger" or the like), thickness/weight and/or estimated bone/fat composition/content (e.g., "2-3" thick, 3-4" thick, breast, leg, thigh" or the like and/or "0.5-1 lb., 1-3 lbs., 3-5 lbs.," or the like), target temperature and/or range, ambient or heating element temperature and/or range, ambient humidity and/or range, identifying information for a user or operator or the like responsible for each of the respective cooks, etc.

It should also be noted that target temperature or range for the sample non-linear prior cook profiles may be extracted or derived from the corresponding temperature data and/or best fit lines derived therefrom, rather than being selected by, acquired from or inputted by a user, and accordingly may also be considered an aspect or measure of such data/lines discussed in more detail below.

Measures of the current food temperature data and sample non-linear prior cook profiles that may be used for matching may include aspects of each set of temperature data taken on and/or the corresponding best fit lines derived for each of the current food item and the plurality of sample food items. For example, one or more of the following measures may be determined, extracted or derived from such temperature data and/or best fit lines: a change in food temperature over time (e.g., a trailing slope for temperature data taken over a pre-defined time period); a maximum food temperature (e.g., analogous and/or mapped to a target temperature); a food item cook duration; and/or other aspects of the temperature data that may be mapped from the current cook onto the sample non-linear prior cook profiles for predictive purposes.

In one or more embodiments, the respective change in food temperature over time for the current food item and cook, and for each of the sample non-linear prior cook profiles, may be determined with reference to a time zero or a cook start time. As discussed above, time zero may occur at the earliest temperature/time data of the temperature data for each food item, may be derived from a polynomial line of best fit comprising each sample non-linear prior cook profile or generated for the current temperature data, may be the earliest temperature/time data of truncated temperature data for a food item where one or more processors of the system truncate the temperature data based on application of a rule for defining a cook start time (such as where a minimum positive change in temperature over a unit time is required to signal the beginning of the cook), and/or may be otherwise defined within the scope of the present invention.

Moreover, the change in food temperature over time may be defined with reference to a current time in the cook for the current food item and a corresponding current cook duration. More particularly, in one or more embodiments, the current time may be the time at the latest datapoint of the temperature data (i.e., the last temperature reading for the current cook), and the current cook duration may be defined as the difference between the current time and the time zero or the cook start time.

In one or more embodiments, the change in temperature over time is determined using the current food item cook duration, and calculated as the change in temperature between the temperature measurement at time zero and the temperature measurement at the current time. Similarly, the change in temperature over time for each of the sample non-linear prior cook profiles may be calculated as the change in temperature between the temperature measurement at time zero of each profile and the temperature measurement at the time in that profile corresponding to the current cook duration (that is, after the same amount of cook time has passed since time zero as the current cook duration). However, in one or more embodiments, the change in temperature over time for each of the sample non-linear prior cook profiles may be calculated as the change in temperature between the temperature measurement at time zero of each profile and the point in the sample non-linear prior cook profile where the temperature was equivalent to the current cook temperature.

The change in temperature over time may also be taken over a more limited portion of the current cook duration, and may be defined as a trailing slope for temperature data taken over a pre-defined time period. For example, the pre-defined time period may be the five (5) minute period immediately preceding the current time in the current cook, with the trailing slope for the current cook accordingly being measured as the change in temperature over that period. Similarly, the trailing slope for each of the sample non-linear prior cook profiles may be calculated as the change in temperature over the five (5) minute period immediately preceding the time in that prior cook profile that corresponds to the current time. However, in one or more embodiments, the trailing slope for each of the sample non-linear prior cook profiles may also be calculated as the change in temperature over the five (5) minute period immediately preceding the point in the sample non-linear prior cook profile where the temperature was equivalent to the current cook temperature.

Similarly, another measure or aspect of the current food temperature data and sample non-linear prior cook profiles that may be used for matching is maximum or target food temperature. For example, for each of the sample non-linear prior cook profiles, a maximum temperature of the temperature data may be taken as the target temperature of the cook. For the current cook, the target temperature may be inputted by the user, for example by selecting a degree of doneness (e.g., "well done," "medium" or "rare"), which may be translated to a temperature in view of the food type of the corresponding food item and one or more pre-defined rules, and/or by inputting or selecting a temperature or temperature range more explicitly at a user interface. In this manner, the target temperature or range of the current food item may be acquired and compared against the maximum or target temperature for each of the sample non-linear prior cook profiles.

As noted above, one or more of the datapoints discussed herein may be used, e.g., in an element test, factor test, weighted summation, neural network or other machine learning model, etc., to match or otherwise select one or more of the sample non-linear prior cook profiles in view of the current food temperature data. For example, a machine learning model comprising a neural network may use the datapoints or a subset thereof as input vectors and utilize a loss function and a training data set to iteratively train the model (e.g., iteratively adjust the weightings of the hidden layers therein) to optimize selection/matching of sample non-linear prior cook profiles leading to the best cook completion time estimates.

One of ordinary skill will appreciate that other machine learning models may be trained to optimize such selection processes. In one or more embodiments, adjusting the weighting assigned to each datapoint through machine learning processes—thereby emphasizing selection and/or representation of some sample non-linear prior cook profile(s) relative to others—will tend to permit the most efficient and effective usage of a high number of self-developed and/or crowd-sourced prior cook profiles, enabling improved precision through optimized use of increased data dimensionality represented thereby.

In one or more embodiments, one or more datapoints may also or alternatively be used as criteria for selecting related sample non-linear prior cook profiles for use in the steps discussed below. For example, such criteria might comprise any one or more of the following: the target temperature for the current cook must be within a threshold (e.g., percent or temperature difference) of the maximum temperature for the sample non-linear prior cook profile being evaluated; the current cook duration must be within a threshold difference relative to the total cook duration of the sample non-linear prior cook profile being evaluated; the trailing slope for the current cook must be within a threshold similarity to the trailing slope of the sample non-linear prior cook profile being evaluated over the same pre-defined time period; and the trailing slope of the sample non-linear prior cook profile being evaluated must be greater than a threshold over the pre-defined time period.

In a more particular example, the target temperature for the current cook must be within twenty-five percent (25%) of the maximum temperature for the sample non-linear prior cook profile being evaluated; the current cook duration must not be more than twenty-five percent (25%) greater than the total cook duration of the sample non-linear prior cook profile being evaluated; the trailing slope for the current cook must be within fifteen percent (15%) of the trailing slope of the sample non-linear prior cook profile being evaluated over the same pre-defined time period (e.g., where the pre-defined time period is equal to five percent (5%) of the current cook duration); and/or the trailing slope of the sample non-linear prior cook profile being evaluated must be greater than negative two thousandths (−0.002) of a temperature unit (e.g., degree Fahrenheit or Celsius) over the pre-defined time period.

In one or more embodiments, one or more of the sample non-linear prior cook profiles may be selected for further use discussed in more detail below.

Referring to step 508, an averaged cook profile may be generated from a subset comprising two (2) or more of the selected sample non-linear prior cook profiles. Step 508 may be performed by one or more of the processors of the thermometer, mobile electronic device and server. In one or more embodiments, step 508 is performed by the server hosting and managing the database comprising the plurality of sample non-linear prior cook profiles following receipt of the current food temperature data and selection/matching of the subset of sample non-linear prior cook profiles.

As discussed in more detail below, step 508 may be performed once or multiple times throughout the current cook, and may be performed periodically or iteratively during the cook as additional current food temperature data is received on a rolling basis to provide multiple sets of updated cook completion time estimates.

In one or more embodiments, the averaged cook profile may be generated from the two (2) or more profiles of the selected sample non-linear prior cook profiles by performing a polynomial regression with the method of least squares, i.e., by minimizing a sum of offsets of the selected sample non-linear prior cook profiles from the resulting averaged model or polynomial comprising the averaged cook profile. One of ordinary skill will appreciate that other computational methods for producing an averaged cook profile from a plurality of sample non-linear prior cook profiles are within the scope of the present invention.

Moreover, in one or more embodiments, weighting may also be applied to bias the averaged cook profile so that it resembles one or more of the constituent subset of the selected sample non-linear prior cook profiles more than the remaining profile(s) of the subset. For example: a weighting may favor a sample non-linear prior cook profile with metadata comprising identifying information indicating the corresponding responsible user (or cook) was the same one performing the current cook and/or was a "trusted" user (e.g., known for producing reliable cook data); a weighting may favor a sample non-linear prior cook profile with metadata indicating the corresponding food item had a more similar bone/fat composition content and/or thickness/weight; a weighting may favor a sample non-linear prior cook profile with metadata indicating the corresponding food item was cooked using a similar heating element (e.g., smoker vs. oven) and/or in a similar ambient environment; a weighting may favor a sample non-linear prior cook profile with similar trailing slopes at the time or temperature corresponding to those of the current cook, as discussed in more detail above; and/or other weightings may be applied.

Wherever polynomial regression with the method of least squares is used to derive the averaged cook profile(s), a person of ordinary skill will appreciate that the weighting may be applied by seeking less offset from the prioritized or more heavily weighted profiles relative to those with less weighting. However, other computational approaches may be utilized within the scope of the present invention to apply such weighting in correspondence with respective varying techniques for deriving average cook profile(s).

It should also be noted, in view of the discussion herein, that weighting may be applied in selecting or matching sample non-linear prior cook profiles to a current cook, in establishing groupings of selected sample non-linear prior cook profiles, and/or in computing or deriving averaged cook profile(s) from the selected sample non-linear prior cook profiles. Where weighting or machine learning models are used in multiple of these stages, one of ordinary skill will appreciate that the accuracy of the resulting cook completion time estimates may be enhanced by training or otherwise adjusting the weighting applied at each of these multiple steps together. Put another way, the training or other weighting adjustments at multiple stages may be interdependent, and, accordingly, may be performed simultaneously and/or in parallel for enhanced or optimized performance. Moreover, criteria may be implemented at one or more stages, alone or together with weighting computations, without departing from the spirit of the present invention.

In one or more embodiments, the averaged cook profile is generated from all the selected sample non-linear prior cook profiles. In one or more embodiments, however, the averaged cook profile is generated from a subset of the selected sample non-linear prior cook profiles. For example, ten (10) sample non-linear prior cook profiles may meet the selection criteria of step 506, but only a subset of those ten (10) matched or selected profiles may be used to generate the averaged cook profile.

In one or more embodiments, the selected sample non-linear prior cook profiles may be sorted according to an aspect or measure of their respective temperature data or best fit lines, and determination of the subset may be based on such sorting. For example, the selected sample non-linear prior cook profiles may be sorted according to respective cook duration, such as from shortest to longest duration. The sorted selected sample non-linear prior cook profiles may further be delineated into quartiles or other groupings. One or more of the quartiles or other groupings may be chosen, with the averaged cook profile being generated from the selected sample non-linear prior cook profiles of the chosen grouping(s). For instance, where quartiles are the implemented grouping, the selected sample non-linear prior cook profiles in the middle two (2) quartiles (25-75% with respect to cook duration) may be used to calculate the averaged cook profile.

In one or more embodiments, a plurality of averaged cook profiles may be generated. For example, where quartiles are the implemented grouping, the selected sample non-linear prior cook profiles in the middle two (2) quartiles (25-50% and 50-75%, referring to cook duration) may be used respectively to calculate two (2) different averaged cook profiles.

It should also be noted that the averaged cook profile(s) may each comprise a polynomial comprising a line of best fit for the averaged temperature data of the constituent ones (i.e., the subset) of the selected sample non-linear prior cook profiles.

Referring to step 510, a cook completion time may be estimated for the current cook based on the one or more averaged cook profile(s). Step 510 may be performed by one or more of the processors of the thermometer, mobile electronic device and server. In one or more embodiments, step 510 is performed by the server hosting and managing the database comprising the plurality of sample non-linear prior cook profiles following receipt of the current food temperature data, selection of the subset of sample non-linear prior cook profiles, and generation of one or more averaged cook profile(s).

As discussed in more detail below, step 510 may be performed once or multiple times throughout the current cook, and may be performed periodically or iteratively during the cook as additional current food temperature data is received on a rolling basis to provide multiple sets of updated cook completion time estimates. Correspondingly, the estimated cook completion time(s) and any associated notifications and/or alarms/timers, discussed in more detail below, may also be generated, displayed or otherwise outputted multiple times during the current cook (e.g., on a rolling basis).

Figure 6:
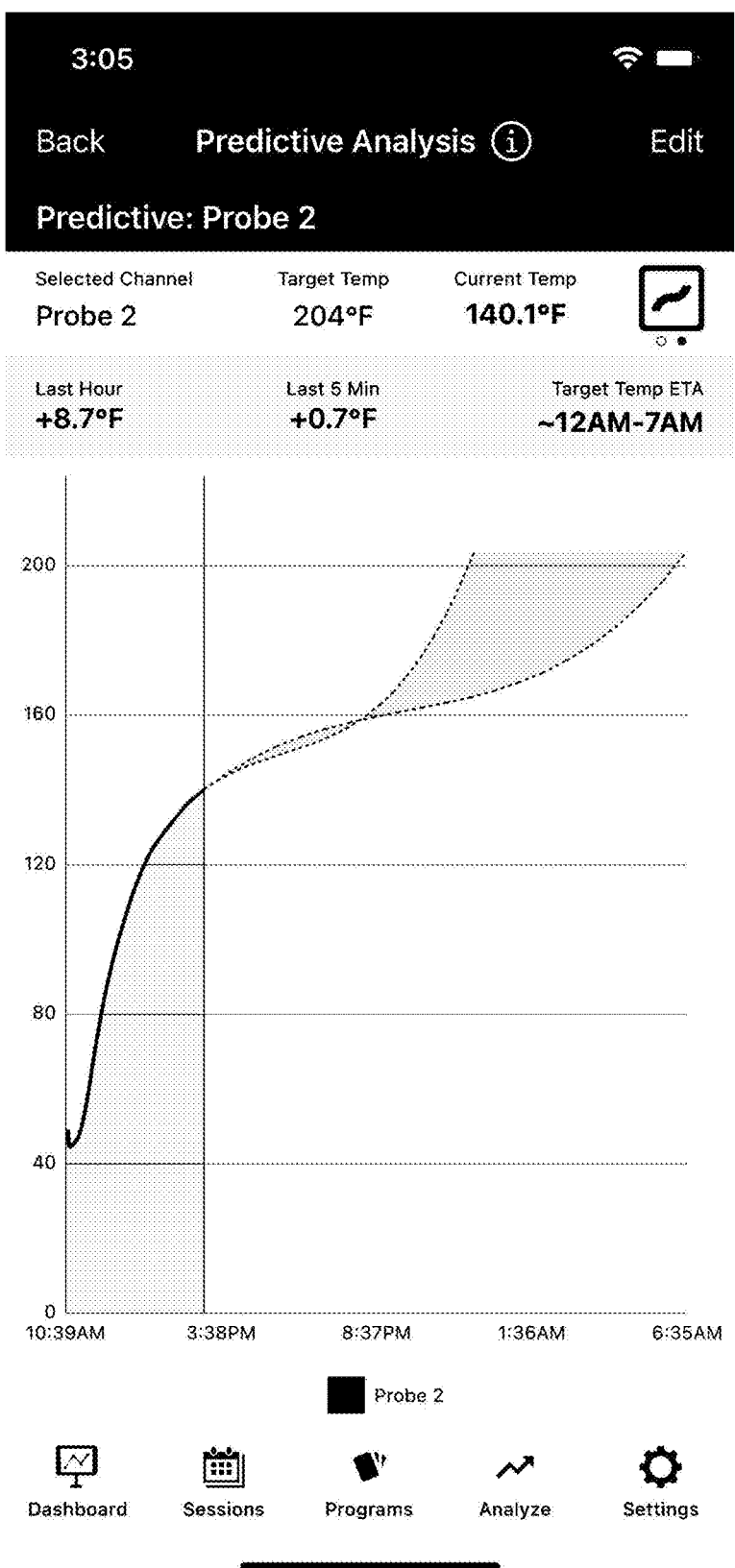
FIG. 6 illustrates a graphic comprising a graph configured for display at a user interface of a computing device, in accordance with one or more embodiments of the present disclosure.

In one or more embodiments, the cook completion time estimate(s) may take the form of an estimated time required to reach the target temperature for the current food item, calculated using the polynomial derived for or comprising each of the averaged cook profile(s) (e.g., according to the discussion above). In one or more embodiments, an estimated cook completion time is generated for each of a plurality of averaged cook profiles, with the corresponding cook completion time estimates thereby forming a range of estimated times. The estimated cook completion time(s) may be outputted as user notification(s) and/or may comprise or be displayed as graphics or graphs of the polynomials derived for or comprising each of the averaged cook profiles, as illustrated in FIG. 6. The graph(s) may be displayed or configured for display on a user interface, such as the user interface of the thermometer and/or the user's mobile electronic device.

It should also be noted that FIG. 6 additionally illustrates actual current temperature data collected for the current cook up to the current time (designated with a vertical line on the illustrated graph). Beyond or to the right of the current time, two (2) polynomials corresponding to averaged cook profiles of second and third ($2^{nd}$ and $3^{rd}$) quartiles generated according to the preceding discussion are plotted to provide and illustrate upper and lower estimates for cook completion time, with the area between being shaded.

In one or more embodiments, those of the selected sample non-linear prior cook profiles that fall in the first and fourth (1st and 4th) quartiles may be excluded from either subset used to generate averaged cook profiles or estimated cook completion times and/or from any other representation in the graph, graphic, notification, alarm or timer (e.g., because they represent the outer limits of the selected profiles and are thus less likely to provide the best estimates for cook completion time).

In one or more embodiments, one or more timers or alarms may also or alternatively be initiated or set (e.g., on the mobile electronic device) for the time(s) at which the current cook is estimated to be completed according to the averaged cook profile(s). Such a timer or alarm notification may be automatically issued—e.g., via audible or visible emission—from one or both of the mobile electronic device and corresponding thermometer. In one or more embodiments, the alarm notification may also or alternatively be transmitted in the form of an electronic message to an email server for delivery to an account of the user and/or in the form of a text message via a short message service (SMS) account associated with the mobile electronic device and/or user or operator.

In one or more embodiments, the actual cook completion time for the current cook is acquired or identified (e.g., via manual input and/or temperature data for the current cook) and utilized—whether alone or together with other user data and/or third party cook data—to retrain model(s) or otherwise adjust weightings for selecting/matching sample non-linear prior cook profiles to current cooks and/or for generating averaged cook profiles for improved accuracy of cook completion time estimation, as discussed in more detail above.

The method may include additional, less, or alternate steps and/or device(s), including those discussed elsewhere herein.

ADDITIONAL CONSIDERATIONS

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as transceiver elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The patent claims at the end of this patent application are not intended to be construed under 35 U.S.C. § 112(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

What is claimed is:

1. A computer-implemented method for food cook completion estimation, the method comprising:

acquiring, via one or more processors, food temperature data from a first food item, the food temperature data comprising a plurality of food temperatures detected at a plurality of different times and reflecting a change in food temperature over time;

acquiring, via the one or more processors, a plurality of additional food temperatures from a second food item at a corresponding plurality of additional different times;

generating, via the one or more processors, a first non-linear prior cook profile from the plurality of additional food temperatures and the corresponding plurality of additional times;

receiving, via the one or more processors, metadata regarding the second food item;

storing, via the one or more processors, the first non-linear prior cook profile in a first food item record of a database;

storing, via the one or more processors, the metadata regarding the second food item with the first non-linear prior cook profile in the first food item record;

receiving, via the one or more processors, additional metadata regarding the first food item;

selecting, via the one or more processors and based on the change in food temperature and on matching the additional metadata to the metadata, the first non-linear prior cook profile from a plurality of non-linear prior cook profiles stored in the database; and estimating, via the one or more processors, a cook completion time based on the first non-linear prior cook profile.

2. The computer-implemented method of claim 1, further comprising performing at least one of the following via the one or more processors: (i) outputting, via the one or more processors, the estimated cook completion time with a user notification; or (ii) setting an alert or timer, via the one or more processors, based on the estimated cook completion time.

3. The computer-implemented method of claim 1, wherein the metadata and the additional metadata comprise one or more food item types or categories and are received via input from one or more users comprising selection from pre-defined options displayed on one or more user interfaces.

4. The computer-implemented method of claim 1, further comprising acquiring, via the one or more processors, the metadata regarding the second food item and the additional metadata regarding the first food item from corresponding first and second labels respectively positioned proximate the second food item and the first food item.

5. The computer-implemented method of claim 1, wherein the metadata and the additional metadata comprise target temperatures respectively for the first food item and the second food item.

6. The computer-implemented method of claim 5, wherein— each of the plurality of non-linear prior cook profiles includes one or more of a corresponding plurality of maximum food temperatures, the target temperature comprising the metadata regarding the second food item is one of the plurality of maximum food temperatures, the matching of the target temperatures comprising the metadata and the additional metadata includes determining that a difference between the target temperature of the second food item and the target temperature of the first food item is less than a threshold.

7. The computer-implemented method of claim 1, wherein the plurality of food temperatures and the plurality of additional food temperatures are respectively acquired by at least one food temperature sensor.

8. A computer-implemented method for food cook completion estimation, the method comprising:

acquiring, via one or more processors, food temperature data from a first food item, the food temperature data comprising a plurality of food temperatures detected at a plurality of different times and reflecting a change in food temperature over time;

acquiring, via the one or more processors, a plurality of additional food temperatures from a second food item at a corresponding plurality of additional different times;

generating, via the one or more processors, a first non-linear prior cook profile from the plurality of additional food temperatures and the corresponding plurality of additional times;

storing, via the one or more processors, the first non-linear prior cook profile in a first food item record of a database;

selecting, via the one or more processors, the first non-linear prior cook profile from a plurality of non-linear prior cook profiles stored in the database, the selection being based on the change in food temperature and including— determining a food item cook duration between first and last times of the plurality of different times of the food temperature data of the first food item, determining a second food item cook duration between a first time and a time at which a maximum food temperature corresponding to the second food item is first reached, determining that a difference between the food item cook duration and the second food item cook duration is less than a threshold; and estimating, via the one or more processors, a cook completion time based on the first non-linear prior cook profile.

9. A computer-implemented method for food cook completion estimation, the method comprising:

acquiring, via one or more processors, food temperature data from a first food item, the food temperature data comprising a plurality of food temperatures detected at a plurality of different times and reflecting a change in food temperature over time;

acquiring, via the one or more processors, a plurality of additional food temperatures from a second food item at a corresponding plurality of additional different times;

generating, via the one or more processors, a first non-linear prior cook profile from the plurality of additional food temperatures and the corresponding plurality of additional times;

storing, via the one or more processors, the first non-linear prior cook profile in a first food item record of a database;

selecting, via the one or more processors, the first non-linear prior cook profile from a plurality of non-linear prior cook profiles stored in the database, the selection being based on the change in food temperature and including— determining a trailing slope of the temperature data comprising a change in temperature over a pre-defined time period ending at the last time of the plurality of different times of the food temperature data of the first food item, determining a second trailing slope of the additional food temperatures and the corresponding plurality of additional different times over the pre-defined period ending at one of the corresponding plurality of additional different times corresponding to a current food item cook duration of the first food item, determining that a difference between the trailing slope and the second trailing slope is less than a threshold; and estimating, via the one or more processors, a cook completion time based on the first non-linear prior cook profile.

10. The computer-implemented method of claim 9, wherein selecting the first non-linear prior cook profile from among the plurality of non-linear prior cook profiles includes determining that the second trailing slope is greater than a second threshold.

11. The computer-implemented method of claim 10, wherein the trailing slope and the second trailing slope are determined by evaluating polynomial equations respectively comprising lines of best fit for the plurality of plurality of food temperatures over the plurality of different times and the plurality of additional food temperatures over the plurality of additional different times.

* * * * *